United States Patent [19]

Newman et al.

[11] 3,743,932
[45] July 3, 1973

[54] CLIPPED CORRELATION TO SIGNAL-TO-NOISE RATIO METER

[75] Inventors: Howard S. Newman, East Lyme; Roger W. Greenough, Oakdale, both of Conn.

[73] Assignee: The United States of America as represented by the Secretary of the Navy, Washington, D.C.

[22] Filed: Mar. 21, 1972

[21] Appl. No.: 236,615

[52] U.S. Cl. ............................. 324/140 D, 325/363
[51] Int. Cl. ........................... G01r 7/00, H04b 1/00
[58] Field of Search ...................... 324/140 D, 57 N; 325/363, 65; 328/165, 162; 307/235; 179/1 P

[56] References Cited
UNITED STATES PATENTS 3,287,646  11/1966  Taylor............................ 324/140 D

FOREIGN PATENTS OR APPLICATIONS 1,046,184  12/1958  Germany ........................ 324/140 D

*Primary Examiner*—Alfred E. Smith
*Attorney*—Richard S. Sciascia, Louis B. Applebaum et al.

[57]  ABSTRACT

A circuit for converting the output of a clipper correlator to signal-to-noise ratio in a signal from a sonar array, comprising a primary diode and a capacitor in parallel therewith, and a series of resistor-secondary diode combinations. Different resistor-secondary diode combinations approximate different regions of the output of the clipper correlator, thus giving an output representing signal-to-noise ratio of the signal. A modified form of the circuit uses field effect transistors (FETS) and differential amplifiers as circuit elements.

7 Claims, 3 Drawing Figures

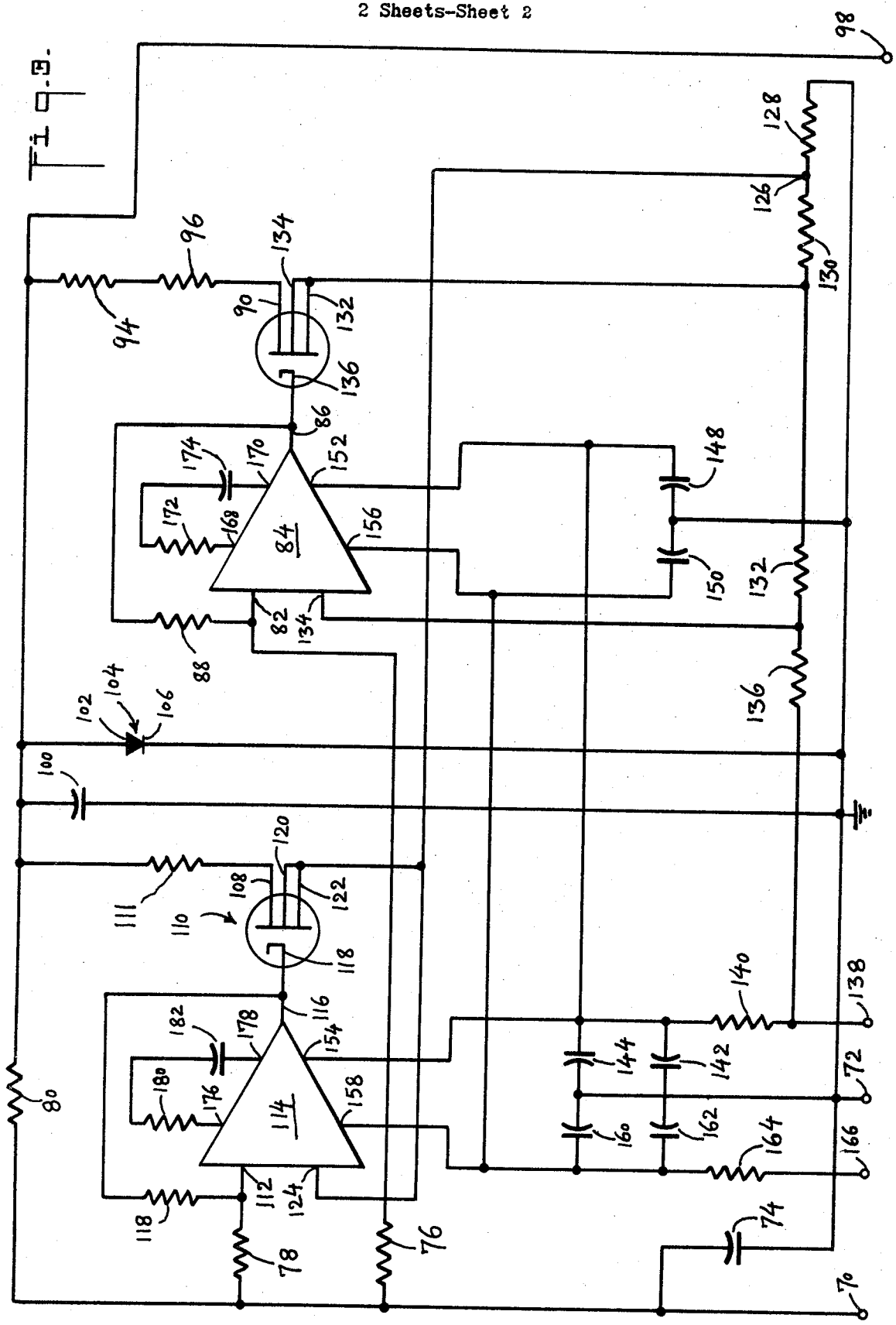

CLIPPED CORRELATION TO SIGNAL-TO-NOISE RATIO METER

STATEMENT OF GOVERNMENT INTEREST

The invention described herein may be manufactured and used by or for the Government of the United States of America for govermental purposes without the payment of any royalties thereon or therefor.

BACKGROUND OF THE INVENTION

The present invention relates to underwater communication and more particularly to signal-to-noise ratio meters in a sonar array for determining the amplitude of true signal in the sonar array signal containing the true signal and noise.

In the field of underwater communication it is very desirable to know the level of a true or real signal, S, coming from an underwater source which is under surveillance. However, such a signal is generally mixed with undesirable noise, N, including self noise and ambient noise. Measuring the sum, S+N, of true signal and the noise, and the ratio, S/N, of the true signal to the noise, one can solve for either the noise N, or the true signal S.

Numerous attempts have been made to determine the level of true signal in a sonar array signal. One such attempt makes use of a clipper correlator circuit. A true signal from an underwater source under surveillance is fed simultaneously to the left and right halves of the sonar array where it mixes itself with the noise in each of the two halves of the sonar array. The output of each half of the sonar array is then fed into a clipper correlator circuit which generates an output signal having an amplitude proportional to the correlation between the output signals of the two halves of the sonar array. If there is no true signal in the output signals of the two halves of the sonar array, the output signal of the clipper correlator circuit is zero, meaning that there is zero correlation between the output signals of the two halves of the sonar array. However, if there is no noise in the output signals of the two halves of the sonar array and each has the same true signal, the output of the clipper correlator circuit will have a maximum voltage value, meaning that there is a perfect correlation between the output signals of the two halves of the sonar array or correlation coefficient between the output signals of the sonar array is one. In the case of a true signal mixed with a noise signal present in the output of each of the two halves of the sonar array, the output of the clipper correlator will lie between the maximum voltage value and zero, meaning the correlation coefficient between the output signals of the two halves of the sonar array is between 0 and 1. It can be shown that the true signal-to-noise ratio, S/N is related to the clipper correlator output, $\rho_c xy$ as:

$$\frac{S}{N} = \frac{\sin\left(\frac{\pi}{2}\rho_c xy\right)}{1 - \sin\left(\frac{\pi}{2}\rho_c xy\right)}$$

Since the clipper correlator output is proportional to S/N, one can determine S/N from the output of the clipper correlator. Knowing S/N and S+N, one can find the value of either S or N as desired. Prior art methods of measuring the ratio S/N from the output of a clipper correlator usually involve two separate circuits; one circuit to do the analog computation, and the other circuit to provide variable time constant data smoothing which was accomplished by manual switching. Furthermore, the analog computation was done by using diodes in the analog computation circuit which were temperature sensitive, which made the output of the circuit temperature dependent.

SUMMARY OF THE INVENTION

The objects and advantages of the present invention are accomplished by a single circuit which performs analog computation and automatic variable time constant data smoothing over the entire dymanic range. One embodiment of the present invention is a circuit which uses a primary diode for accepting only one polarity of output signals of the clipper correlator and a plurality of resistor-secondary diode combinations which provide various time constants to the output signal of the clipper correlator to scale down the signal so as to keep the scaled down clipper correlator output signal on the linear scale of a signal-to-noise ratio meter over the entire dynamic range. Another embodiment of the present invention uses another circuit wherein the diodes of the circuit of the first embodiment are replaced by field effect transistors, commonly known as FETS, to eliminate any temperature dependence of the circuit. The switching of various FETS is accomplished by using differential amplifiers where the output of the clipper correlator is compared with a reference signal. A field effect transistor (FET) is turned on if the output signal of the clipper correlator exceeds a preset reference voltage of one of the differential amplifiers used in the circuit.

It is an object of the invention to provide a single circuit which converts the output signal of a clipper correlator to a signal-to-noise ratio meter reading, the meter having a scale over the entire dynamic range.

Another object of the invention is to provide a circuit which makes analog computation as well as variable time constant data smoothing automatically.

Still another object of the invention is to provide a circuit for converting the output signal of a clipper correlator to signal-to-noise ratio wherein the operation of the circuit is not affected by any temperature changes.

Other objects, advantages and novel features of the invention will become apparent from the following detailed description of the invention when considered in conjunction with the accompanying drawings wherein:

BRIEF DESCRIPTION OF THE DRAWINGS

FIG. 3 shows another circuit which is a second preferred embodiment of the invention.

DESCRIPTION OF PREFERRED EMBODIMENTS

The ratio of true signal-to-noise, S/N, when the signals from the two halves of a sonar array are fed into a clipper correlator circuit, is related to $\rho_c xy$, the clipper correlator output as $$\frac{S}{N} = \frac{\operatorname{Sin}\left(\frac{\pi}{2}\rho_c xy\right)}{1 - \operatorname{Sin}\left(\frac{\pi}{2}\rho_c xy\right)} \qquad (1)$$

or $\rho_c xy = 2/\pi \operatorname{Sin}^{-1}(S/N)/(1+S/N)$ (2)

For any value of $S/N$, the corresponding value of $\rho_c xy$ can be calculated.

Figure 1:
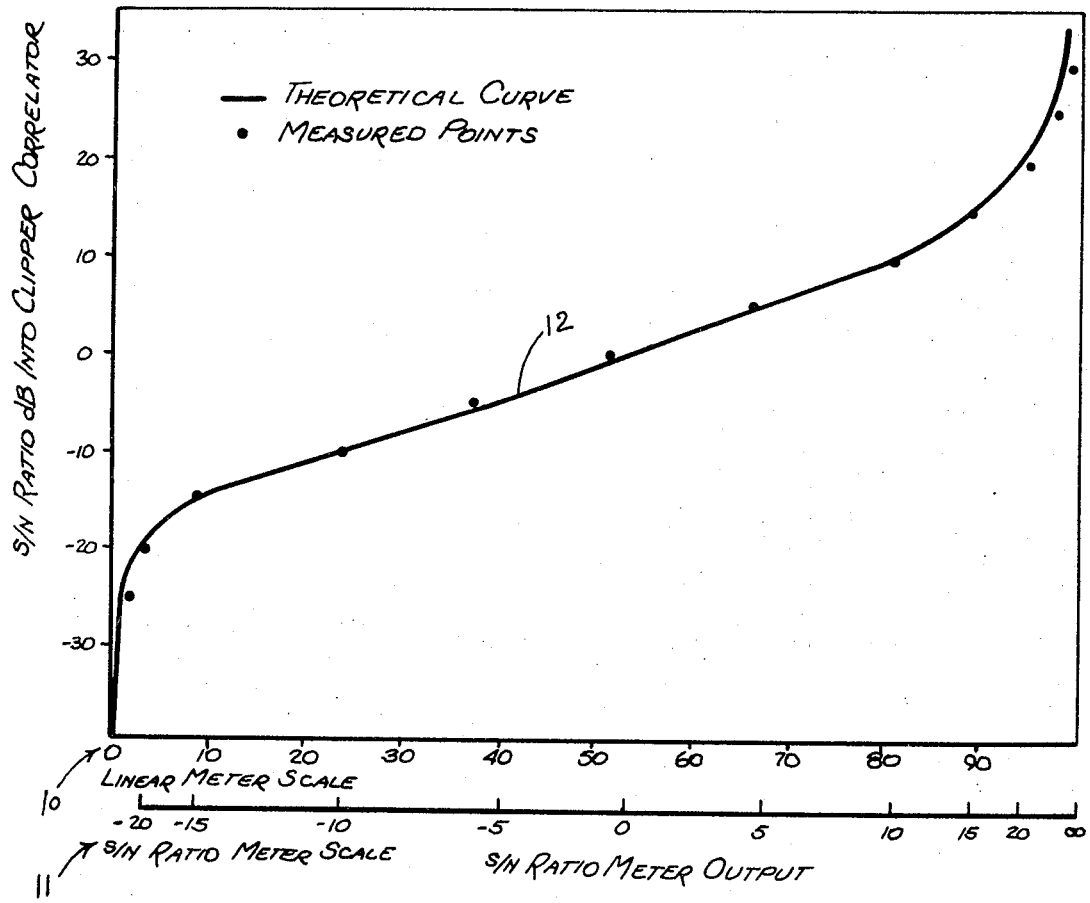
FIG. 1 is a graphical plot of S/N, signal-to-noise ratio expressed in decibels and the S/N ratio meter output.

FIG. 1 is a graphical plot between signal-to-noise ratio expressed in decibels ($dB$), i.e., $10 \log_{10} S/N$ and the $S/N$ ratio meter output expressed in terms of a linear meter scale 10 and a $S/N$ ratio meter scale 11. A solid curve 12, hereinafter referred to as theoretical or desired curve, has a point corresponding to $S/N = 1$ or $10 \log_{10} S/N = 0$ lying proximate the midpoint of the ratio meter linear scale 12 and the points corresponding $S/N = +\infty$ and $S/N = -\infty$ lying respectively at the highest and the lowest points of the ratio meter linear scale 10 and the remaining portion of the solid curve 12 adjusted likewise. A useful range of the $S/N$ ratio is taken from $S/N = 31.62$ or $+15$ $dB$ to $S/N = 3.162 \times 10^{-2}$ or $-15$ $dB$, which falls within the ratio meter linear scale readings of approximately 8 and 89. The portion of the theoretical curve 12 corresponding to signal-to-noise ratio levels of $+15$ $dB$ and $-15$ $dB$ is then approximated by having two break points and three different slopes covering ranges of (1) up to $-10$ $dB$, (2) $-10$ $dB$ to $-5$ $dB$, and (3) $-5$ $dB$ and up. The solid points on the graphical plot represent the measured or experimental points for different signal-to-noise ratio levels and show a favorable agreement with the corresponding points on the desired or theoretical curve 12. The experimental points are obtained by feeding the outputs of the circuits embodying the present invention to the $S/N$ ratio meter having the linear scale 10.

FIRST EMBODIMENT

Figure 2:
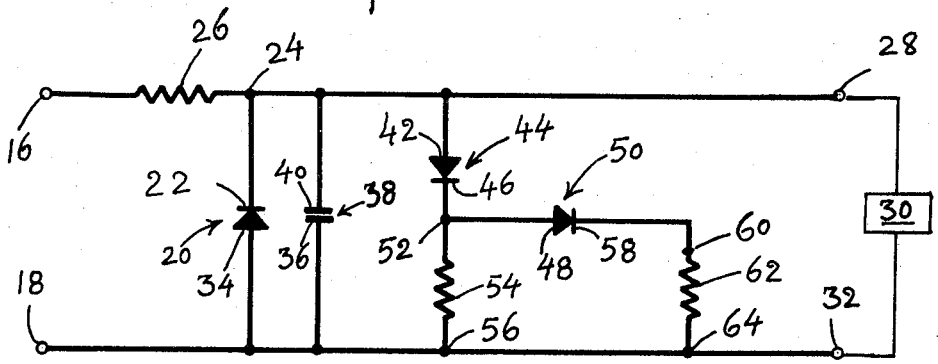
FIG. 2 shows a circuit which is a first preferred embodiment of the invention.

As shown in FIG. 2, the output of a clipper correlator (not shown in the drawings) is applied across terminals 16 and 18 of the circuit. A primary diode 20 has its cathode 22 connected to end 24 of a resistor 26, the other end of resistor 26 being connected to terminal 16. End 24 of resistor 26 is also connected to terminal 28, which is one of the input terminals for a $S/N$ ratio meter 30, which is a common voltage meter having a linear scale. The second input terminal 32 of the $S/N$ ratio meter 30 is connected to the terminal 18. The anode 34 of diode 20 is connected to plate 36 of a capacitor 38 and to terminal 18. The second plate 40 of capacitor 38 is connected to anode 42 of a first secondary diode 44 and to terminal 28. Cathode 46 of diode 44 is connected to anode 48 of a second secondary diode 50 and end 52 of resistor 54. The other end 56 of resistance means 54 is connected to terminals 18 and 32. Cathode 58 of diode 50 is connected to end 60 of resistance means 62 which has its end 64 connected to terminals 18 and 32.

In operation, the output signal of a clipper correlator is applied to terminals 16 and 18 of the circuit. The primary diode 20 acts as a short circuit for voltage signals which make terminal 16 negative relative to terminal 18. Consequently, only those voltage signals from the output of the clipper correlator (not shown in the drawings) which turn terminal 16 positive relative to terminal 18 see diode 20 as a very high resistance and give rise to attenuated output signals at terminals 28 and 32.

When such input signals are of low amplitude and the diodes 44 and 50 are not conducting, the time constant of the circuit is determined by the resistor 26 and capacitor 38 combination, which in turn determines the slope of the straight line approximating the lower portion of the theoretical curve 12 of the graphical plot of FIG. 1 corresponding to values of S/N S/N ratio levels below $-10$ $dB$. The attenuation of the input signal applied across terminals 16 and 18 is enough to keep the $S/N$ ratio meter reading due to the output signal available across terminals 28 and 32 within the linear scale of the $S/N$ ratio meter 30. For higher amplitudes and proper polarity of the input signals applied across terminals 16 and 18, diode 44 starts conducting while diode 50 is still in a non-conductive state. This attenuates the input signal across terminals 16 and 18 due to series combination of resistors 26 and 54 to give an output signal across terminals 28 and 34 which keeps the $S/N$ ratio meter reading within its linear scale. The time constant of the circuit for this case is determined by capacitor 38, resistor 26 and resistor 54 combination. Another straight line having a slope determined by this time constant approximates middle portion of the solid curve 12 of the graphical plot of FIG. 1 corresponding to values of $S/N$ ratio levels between $-10$ $dB$ and $-5$ $dB$.

For still higher amplitudes and proper polarity of the input signals applied across terminals 16 and 18, diodes 44 and 50 start conducting almost simultaneously. This attenuates the input signal across terminals 16 and 18 due to very low resistance offered by the conducting diodes 44 and 50 and the parallel combination of resistor 54 and 62 offering a resistance lower than the resistance of either of resistors 54 and 62. The output signal to be applied to the $S/N$ ratio meter 30 across terminals 28 and 32 is thus attenuated so that the $S/N$ ratio meter reading is still within its linear scale. The time constant of the circuit for this situation is determined by capacitor 38 and resistor 26 in series with resistors 54 and 62 in parallel, which in turn determines the slope of still another straight line approximating the top portion of the desired curve 12 corresponding to the values of $S/N$ ratio levels of $-5$ $dB$ and above.

The plot of FIG. 1 compares the solid measured points with the desired or theoretical curve 12.

SECOND EMBODIMENT

A second embodiment of the invention is shown in FIG. 3 wherein the output of a clipper correlator is applied across terminals 70 and 72, terminal 72 being at ground potential. Terminal 70 is connected to a first end of each of a capacitance 74, resistors 76, 78, and 80. The second end of capacitance 74 is connected to ground through terminal 72. The second end of resistor 76 is connected to non-inverting input terminal 82 of a first differential amplifier 84 and also to the output terminal 86 of the differential amplifier 84 through a resistor 88. The second end of resistor 80 is connected to output terminal or drain means 90 of a first metaloxide-semiconductor 92, hereinafter called the first MOS type FET or MOSFET, through two resistors 94 and 96 which are connected in series with each other. The second end of resistor 80 is also connected to (a) the output terminal 98 for the $S/N$ ratio meter (not shown in FIG. 3), (b) one plate of a capacitor 100 having its other plate connected to ground through terminal 72, (c) anode 102 of a diode 104 having its cathode 106 connected to ground, and (d) output terminal or drain means 108 of a second MOSFET 110 through a resistance means 111. The second end of resistor 78 is connected to (a) non-inverting input terminal 112 of a second differential amplifier 114, (b) the output terminal 116 of the differential amplifier 114 through a resistor 118. The output terminal 116 of the differential amplifier 114 is also connected to a first gate means of MOSFET 110. The second gate means 120 of MOSFET 110 is connected to (a) its source means 122, (b) inverting input terminal 124 of differential amplifier 114, and (c) junction point 126 of first end of each of two resistors 128 and 130 connected in series. The second end of resistor 128 is connected to ground, preferably through terminal 72. The second end of resistor 130 is connected to source 132 and second gate means 134 of MOSFET 92, which has its first gate means 136 connected to the output terminal 86 of differential amplifier 84, and to a first end of a resistor 132. The second end of resistor 132 is connected to inverting input terminal 134 of differential amplifier 84 and to a first end of a resistor 136. The second end of resistor 136 is connected to negative biasing voltage terminal 138 and to a first end of a resistor 140. The second end of resistor 140 is connected to (a) first end of each of capacitances 142 and 144, (b) a first end of capacitance 148 having its second end connected to ground terminal 72, and a first end of a capacitance 150, (c) terminal 152 of differential amplifier 84, and (d) terminal 154 of differential amplifier 114. The second end of capacitance 150 is connected to (a) terminal 156 of differential amplifier 84, (b) terminal 158 of differential amplifier 114, (c) a first end of capacitance 160, (d) a first end of capacitance 162, and (e) to a first end of a resistor 164 with its second end connected to positive biasing voltage terminal 166. The second end of capacitance 160 is connected to ground terminal 72 and to the second end of capacitance 144. The second end of capacitance 162 is connected to the second end of capacitance 142. Terminals 168 and 170 of differential amplifier 84 are connected through a resistor 172 and a capacitance 174. Terminals 176 and 178 of differential amplifier 114 are connected through a resistor 180 and a capacitance 182.

The output of a clipper correlator (not shown in the drawings) is applied across terminals 70 and 72 and the output going to the S/N ratio meter is taken across terminals 98 and 72, with terminals 72 acting as common ground. The output signal of a clipper correlator is then compared with a standard voltage where the correlator output signals fed at either terminals 82 and 134 of differential amplifier 84, or terminals 112 and 124 of differential amplifier 114. The standard voltage levels in differential amplifiers 84 and 114 are supplied at terminals 152, 156 and 154, 158 by external voltage sources (not shown in the drawings) connected at terminals 166, 72, and 138 and appropriate biasing elements such as resistor 140, 164 and appropriate decoupling capacitors 142, 144, 148, 150, 160, and 162. Resistors 88, 172, and 118, 180 and capacitors 174 and 182 are used to provide feedback for stabilized operation of the differential amplifiers 84 and 114. Capacitor 74 is used to filter any extraneous high frequency signal present. Resistors 128, 130, 132, and 136 further provide biasing of differential amplifiers 84 and 114. Both differential amplifiers are biased separately at different voltages and thus give rise to a non-zero output signal at different ranges of the output signals of a clipper correlator. The non-zero output signals of the two differential amplifiers switch on MOSFETS 92 and 110. Thus the differential amplifiers act as electronic switches for the MOSFETS and function independently of any ambient temperature variations. Diode 104 is used as a protection device and resistors 76 and 78 act as input resistance means. Various time constants determining the slopes of the straight lines used to approximate the theoretical curve are determined by capacitor 100 in combination with resistors 80; 80 and 111; and 80, 94, and 96.

The operation of the circuit is similar to that of the circuit of the first embodiment. When the output signal of a clipper correlator is below the constant D.C. voltage setting of either of the two differential amplifiers 84 and 114, the two MOSFETS 90 and 110 are in off condition and the time constant determining the slope of the straight line approximating the lower portion of the theoretical curve 12 is given by the resistor 80 and capacitor 100 combination. When the level of an output signal of a clipper correlator is such as to switch on MOSFET 110, the slope of the straight line approximating the middle portion of the theoretical curve is determined by the combination of resistors 80 and 111 and capacitor 100. When MOSFET 92 is switched on in addition to the MOSFET 110 in on condition, the combination of resistors 80, 111, 94, and 96 and capacitor 100 determines the slope of another straight line approximating the top portion of the theoretical curve. Values of resistors 128, 130, 132, and 136 are quite small as compared to the resistors 80, 111, 94, and 96 to provide the signal a low resistance path to ground.

Obviously many modifications and variations of the present invention are possible in the light of above teachings. As an example, it may be possible to change the number of straight lines approximating a desired curve by providing different time constants in the circuit.

It is therefore understood that within the scope of the appended claims the invention may be practiced otherwise than as specifically described.

We claim:
1. A signal-to-noise ratio meter circuit for determining said ratio of an electrical wave signal, which comprises:
  a first terminal, a second terminal, and a third terminal;
  a meter having a linear scale, said meter being connected across said second and third terminals for measuring output of said circuit;
  a first resistor, a second resistor, and a third resistor, said first resistor being connected between said first terminal and said second terminal;
  a capacitance connected across said second terminal and said third terminal, said capacitance and said first resistor forming a first time constant network;
  a first diode having the anode thereof connected to said second terminal and the cathode thereof connected to a first end of said second resistor with a second end of said second resistor connected to said third terminal, said capacitor and said first and second resistors forming a second time constant network;
  a second diode having the anode thereof connected to said first end of said second resistor and the cathode thereof connected to a first end of said third resistor with a second end of said third resistor being connected to said third terminal, said capacitor and said first, second, and third resistors forming a third time constant network, whereby the signal-to-noise ratio of a wave signal applied across said first and third terminals will be indicated on said meter.

2. The circuit of claim 1 which further comprises:
a third diode with the cathode thereof being connected to said second terminal and the anode thereof being connected to said third terminal.

3. A signal-to-noise ratio meter circuit for determining said ratio of an electrical wave signal, which comprises:
 a first terminal, a second terminal, and a third terminal, said electrical signal being applied across said first and second terminals;
 a meter having a linear scale, said meter being connected across said second and third terminals for measuring the output of said circuit;
 a first resistor with a first end thereof being connected to said first terminal and a second end being connected to said third terminal;
 a capacitance with one end thereof being connected to the second end of said first resistor and the second end of said capacitor being connected to said second terminal, said first resistor and said capacitor forming a first time constant network;
 a first comparator means for comparing said electrical signal with a first standard voltage up to a first voltage level of said electrical signal, an input terminal of said first comparator means being connected to said first input terminal;
 a second comparator means for comparing said electrical signal with a second standard voltage for values of said electrical signal between said first voltage level and a second voltage level, an input terminal of said second comparator means being connected to said first input terminal;
 a first switching means having a first end and a second end, said first end being connected to the output terminal of said first comparator means;
 a second resistor with one end being connected to the second end of said first switching means and the other end of said second resistor being connected to said third terminal, said second resistor forming a second time constant network in combination with said first resistor and said capacitance;
 a second switching means having a first end and a second end, said first end being connected to output terminal of said second comparator means;
 a third resistor with one end being connected to the second end of said second switching means and the other end of said third resistor being connected to said third terminal, said third resistor forming a third time constant network in combination with said first resistor, said second resistor and said capacitance.

4. The circuit of claim 3 wherein said first comparator means is a first differential amplifier wherein said electrical signal is applied to the non-inverting input terminal thereof.

5. The circuit of claim 4 wherein said second comparator means is a second differential amplifier wherein said electrical signal is applied to the non-inverting input terminal thereof.

6. The circuit of claim 5 wherein said first switching means is a first MOSFET.

7. The circuit of claim 6 wherein said second switching means is a second MOSFET.

* * * * *